United States Patent
Dettmann et al.

(10) Patent No.: US 8,701,408 B2
(45) Date of Patent: Apr. 22, 2014

(54) CONNECTING DEVICE, DRIVING DEVICE AND CHARGING DEVICE

(75) Inventors: Tobias Dettmann, Rüterberg (DE); Frank Neumann, Bad Langensalza (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 509 days.

(21) Appl. No.: 13/005,961

(22) Filed: Jan. 13, 2011

(65) Prior Publication Data

US 2011/0185725 A1    Aug. 4, 2011

(30) Foreign Application Priority Data

Jan. 14, 2010 (DE) .......... 10 2010 004 559

(51) Int. Cl.
*F02D 23/00* (2006.01)
(52) U.S. Cl.
USPC .............. 60/602; 60/603; 60/605.1; 415/157
(58) Field of Classification Search
USPC ................. 60/603, 605.1, 602; 415/157, 158; 403/59, 61, 114, 115; 92/136, 140
See application file for complete search history.

(56) References Cited

U.S. PATENT DOCUMENTS

| | | | |
|---|---|---|---|
| 4,023,432 A | | 5/1977 | Killian |
| 5,681,143 A | * | 10/1997 | Ratner .......................... 415/158 |
| 6,443,696 B1 | | 9/2002 | Erdmann et al. |
| 6,658,846 B1 | | 12/2003 | McEwan |
| 6,983,596 B2 | * | 1/2006 | Frankenstein et al. .......... 60/602 |
| 7,052,338 B2 | * | 5/2006 | Morvillo .......................... 440/41 |
| 7,059,574 B2 | * | 6/2006 | Oddsen, Jr. .............. 248/280.11 |
| 7,186,076 B2 | * | 3/2007 | Doring et al. ................. 415/158 |
| 7,644,583 B2 | * | 1/2010 | Leavesley ..................... 60/602 |
| 7,677,040 B2 | * | 3/2010 | McEwan ........................ 60/602 |
| 7,823,385 B2 | * | 11/2010 | McEwen et al. ................ 60/602 |
| 8,172,513 B2 | | 5/2012 | Frankenstein et al. |

(Continued)

FOREIGN PATENT DOCUMENTS

| | | |
|---|---|---|
| DE | 2656599 A1 | 6/1977 |
| DE | 19816645 A1 | 10/1999 |

(Continued)

OTHER PUBLICATIONS

English abstract for FR-2823795.

(Continued)

*Primary Examiner* — Thomas Denion
*Assistant Examiner* — Thomas Olszewski
(74) *Attorney, Agent, or Firm* — Rader, Fishman & Grauer PLLC

(57) ABSTRACT

A connecting device, comprising: a linearly driving drive member; an actuating member driven in a rotating manner by an internal combustion engine charging device with at least one pivot arm connected to the actuating member in a fixed manner, wherein the actuating member transmits rotational moments about a pivot axis, with a slide element connected to the driving member in a fixed manner, and wherein the driving member transmits linear forces oriented obliquely to the pivot axis, with at least one bearing arrangement, which moveably couples the slide element to the pivot arm such that the slide element is displaceably mounted along a displacement axis running parallel to the pivot axis and rotatably mounted about the displacement axis and about a rotary axis running perpendicularly to the displacement axis.

20 Claims, 4 Drawing Sheets

(56) References Cited

U.S. PATENT DOCUMENTS

| | | | |
|---|---|---|---|
| 8,186,158 B2* | 5/2012 | Nishiyama et al. | 60/602 |
| 8,230,683 B2* | 7/2012 | Fledersbacher et al. | 60/602 |
| 2003/0074898 A1* | 4/2003 | McEwen et al. | 60/602 |
| 2007/0119170 A1* | 5/2007 | Masson et al. | 60/600 |
| 2010/0095672 A1* | 4/2010 | An | 60/602 |
| 2011/0000209 A1* | 1/2011 | Boening et al. | 60/602 |
| 2011/0005222 A1* | 1/2011 | Hayashi et al. | 60/602 |

FOREIGN PATENT DOCUMENTS

| | | |
|---|---|---|
| DE | 10235528 A1 | 2/2004 |
| DE | 202005008606 U1 | 8/2005 |
| EP | 0976919 A2 | 2/2000 |
| EP | 1256703 A2 | 11/2002 |
| EP | 2143905 A1 | 1/2010 |
| FR | 2823795 A1 | 10/2002 |
| JP | 2003-148155 A | 5/2003 |

OTHER PUBLICATIONS

English abstract for JP-20033148155.

English abstract for DE-10235528.

Extract German specialist book: Franke—Die Entwicklungslehre der Getriebe.

Extract German specialist book: Lichtenheldt; Luck—Konstruktionslehre der Getriebe.

German Examniation Report dated Mar. 21, 2013.

* cited by examiner

CONNECTING DEVICE, DRIVING DEVICE AND CHARGING DEVICE

CROSS-REFERENCES TO RELATED APPLICATION

This application claims priority to German patent application DE 10 2010 004 559.4 filed on Jan. 14, 2010, which is hereby incorporated by reference in its entirety.

TECHNICAL FIELD

The present invention relates to a connecting device for the jointed connecting of a linearly driving driving member and an actuation member to be driven in a rotating manner of a charging device for a combustion engine, particularly of a motor vehicle. The invention additionally relates to a driving device for actuating an adjusting device of a charging device, particularly of an exhaust gas turbocharger of a combustion engine, particularly of a motor vehicle equipped with such a connecting device. In addition, the present invention relates to a charging device, particularly an exhaust gas turbocharger of a combustion engine, particularly of a motor vehicle having such a connecting device.

BACKGROUND

Charging devices for charging a combustion engine are generally known. Charging devices operating with a turbine, particularly exhaust gas turbochargers, can be equipped with a variable turbine geometry, so-called VTG, and/or with a controllable bypass, so-called waste gate, for the power regulation of the charging device or of the turbine. For controlling the bypass or the waste gate, a corresponding bypass valve or waste gate valve is provided, which can for example be a flap that can be pivoted open against a resetting spring. Here, actuation of the waste gate valve is effected via a rotary movement. For actuating the waste gate valve the respective charging device can be equipped with a driving device which operates with an adjusting drive for the linear driving of a driving member. For example, the adjusting drive is equipped as pneumatic actuator or pressure box, with the help of which a driving member can be linearly driven. Problematic now is the coupling between a linearly driven driving member and an actuation member of the respective adjusting device to be driven in a rotary manner, i.e. the waste gate valve in this case. For during the linear movement of the driving member the relative position between driving member and actuation member changes because of the rotary movement of the actuation member. To make this possible, a connecting device of the type mentioned at the outset can be used, since it provides a jointed connection between the linearly driving driving member and the actuation member to be driven in a rotary manner. In addition, unfavorable installation situations, oblique positions and assembly tolerances can be offset with such a connecting device. Corresponding problems also materialize upon the actuation of a VTG.

From FR 2 823 795 B1 it is known with an exhaust gas turbocharger to equip the driving member of the connecting device or of the driving device with a ball head and to equip the actuating member for the pivoting of the flap of the waste gate valve with a ball head mounting. Such a ball head joint makes possible the required spatial relative movements between driving member and actuating member. Realizing such a ball head mounting can involve a comparatively major effort because of the required manufacturing precision.

Additional connecting devices with exhaust gas turbochargers or corresponding driving devices of this type are known from JP 2003-148155 A and from EP 0 976 919 B1.

From EP 1 256 703 B1 another connecting device is known, wherein the driving member and the actuating member are interconnected in a fixed manner, wherein the driving member consists of a flexurally elastic wire cable so that the driving member itself acts as joint and can absorb the changes in the relative position between driving member and actuating member that occur during the adjusting movement through elastic deformation.

SUMMARY

The present invention deals with the problem of stating an improved or at least another embodiment for a connecting device of the type mentioned at the outset or for a driving device equipped with such or for a charging device equipped with such, which is characterized by simple manufacturability or by a reliable operating method.

According to the invention, this problem is solved through the subjects of the independent claims. Advantageous embodiments are the subject of the dependent claims.

The invention is based on the general idea of equipping the connecting device with a slide element and with a bearing arrangement. While the slide element can be permanently connected to the driving member in a fixed manner, the bearing arrangement makes possible multi-dimensionally moveable coupling of the slide body to the pivot arm. To this end, the bearing arrangement is configured such that the slide element is displaceably mounted relative to the pivot arm along a displacement axis running parallel to the pivot axis and rotatably mounted about the displacement axis and about a rotary axis running perpendicularly to the displacement axis. Through the rotatability of the sliding element relative to the pivot arm about the rotary axis and about the displacement axis on the one hand and through the displaceability of the slide element relative to the pivot arm along the displacement axis, three degrees of freedom for relative movements between the slide element and the pivot arm are provided with the help of the bearing arrangement which are sufficient to guarantee the desired jointed coupling between driving member and actuating member throughout the adjusting range. There, both the slide element as well as the bearing arrangement can be realized comparatively cost-effectively, for example with the help of cylindrical elements. Furthermore, comparatively high operating reliability is also expected through the proposed coupling.

According to an advantageous embodiment the bearing arrangement can be configured as journal bearing, wherein such a journal bearing comprises a journal mounting having a cylindrical inner contour or an inner contour formed with circular segments arranged coaxially to the displacement axis or coaxially to the rotary axis. Such geometries can be produced comparatively simply with high precision. Because of this, a reproducible quality can be realized comparatively cost-effectively.

With a special embodiment the journal mounting can be connected to the pivot arm in a fixed manner, for example welded to the latter. Alternatively, the journal mounting can also be integrally molded on to the pivot arm, which increases the degree of integration of the pivot arm.

Practically, the slide element can be directly mounted in the journal mounting. To this end, the slide body practically comprises an outer contour interacting with the inner contour, which can be configured ball-shaped or formed with ball segments. With this embodiment, the coupling device requires extremely few components, namely only the slide element and the journal mounting, wherein optionally the slide element can be integrally molded on to the driving member, while the journal mounting can be integrally molded on to the pivot arm. Because of this, particularly the assembly of the connecting device is simplified.

With an alternative embodiment the bearing arrangement can comprise a coupling member comprising a coupling journal mounted in a (first) journal mounting and a further or second journal mounting, in which the slide element is mounted. With this embodiment the connecting device in addition to the slide element comprises the coupling member comprising the coupling journal and the second journal mounting. With the help of this additional coupling member the different degrees of movement are realized separately from one another or at least one further movement degree of freedom can be realized within the connecting device with the help of the coupling member. In addition, the coupling member makes possible a simplification of the geometries of the individual components of the connecting device, which lowers the manufacturing costs and assembly costs.

With a further embodiment the coupling journal can be displaceably mounted in the first journal mounting along the displacement axis and rotatably mounted about the pivot axis, while the slide element in the second journal mounting is mounted rotatably about the rotary axis and displaceably along the rotary axis. More preferably, slide element and coupling journal are displaceable perpendicularly to each other as a result. Because of this, particularly manufacturing tolerances during the assembly of the driving device can be offset.

Alternatively it can be provided to mount the coupling journal in the first journal mounting rotatably about the rotary axis and displaceably along the rotary axis, while the slide element in the second journal mounting is mounted rotatably about the displacement axis and displaceably along the displacement axis.

With an alternative solution it is proposed to realize the connecting device with the help of a spring-elastic metal band whose ends with respect to a longitudinal centre axis passing through the ends are twisted relative to each other by 90°. The spring band formed in this manner can be bent spring-elastically in any direction transversely to its longitudinal centre axis, as a result of which it can offset the relative position changes that occur between driving member and actuating member in a jointed manner. The alternative solution introduced here thus proposes connecting the drive member to the actuating member via such a spring band or configuring the driving member itself or at least a portion of the driving member as such a spring band. Manufacturing such a spring band is extremely cost-effective. Since no separate components mounted on one another are required, this solution operates quasi free of wear and highly reliably. The spring band allows a transmission of tensile and compressive forces while it can flexibly yield with respect to transverse forces.

The spring band can have a twisting of 90° for realizing the 90° twist between its ends. Alternatively, a 90° offset can be realized on a connecting plate welded on in the middle of the spring band. In addition or alternatively, the outer ends of the spring band can comprise fastening flanges angled at a right angle and provided with connecting bores which are offset by 90° plane-parallel to one another. Here, it is particularly practical to equip at least one end of the spring band with an axially adjusting, self-locking screw connection.

Further important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWING

Preferred exemplary embodiments of the invention are shown in the drawing and are explained in more detail in the following description, wherein same reference characters refer to same or similar or functionally same components.

It shows, in each case schematically.

DETAILED DESCRIPTION

Figure 5:
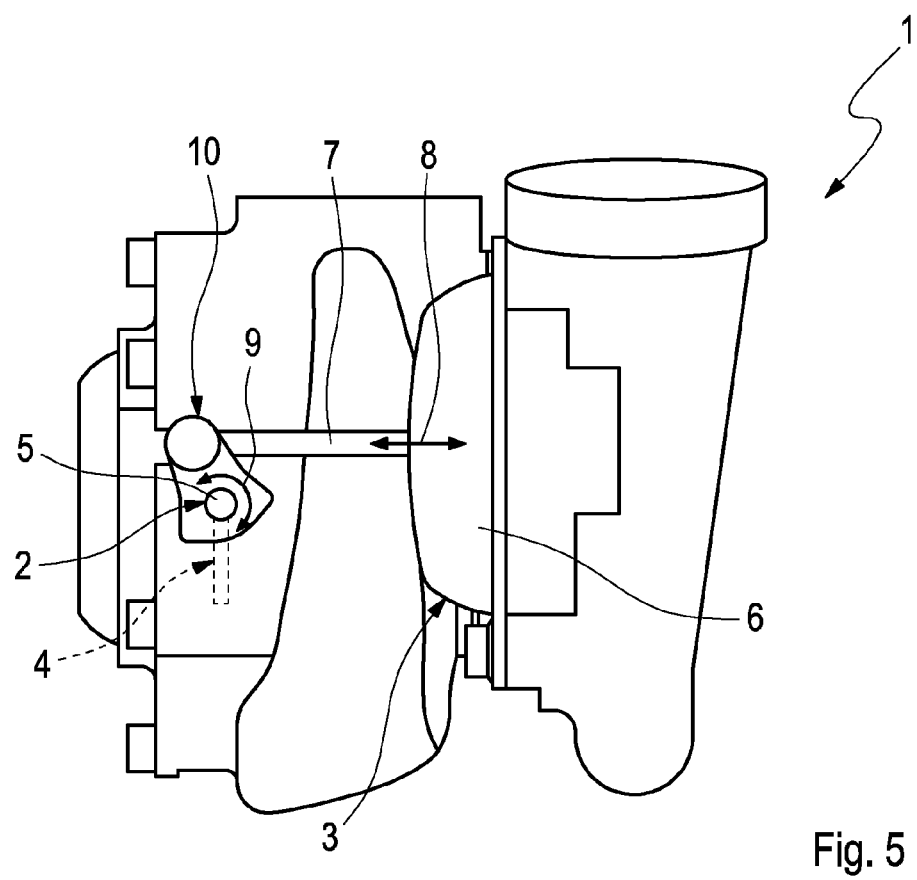

According to FIG. 5, a charging device 1, which preferably is configured as exhaust gas turbocharger, and which is employed for charging a combustion engine, that is particularly in a motor vehicle, comprises an adjusting device 2 and a driving device 3. The adjusting device 2 serves for actuating a component 4 of the charging device 1, which for example can be a waste gate valve. Alternatively, the component 4 can also be a variable turbine geometry of the charging device 1. A respective component 4 at any rate comprises a rotatingly drivable actuation member 5, e.g. a shaft. The driving device 3 serves for actuating the adjusting device 2. To this end, the driving device 3 comprises an actuator 6 for the linear driving of a driving member 7. The actuator 6 can operate electrically or hydraulically or pneumatically; it can be embodied as pressure box. The linear adjustability of the driving member 7 is indicated in FIG. 5 by a double arrow 8. The twistability of the actuation member 5 is indicated in FIG. 5 by a double arrow 9.

The driving device 3 is equipped with a connecting device 10 with the help of which the driving member 7 is connected to the actuating member 5 in a jointed manner.

Figure 1:
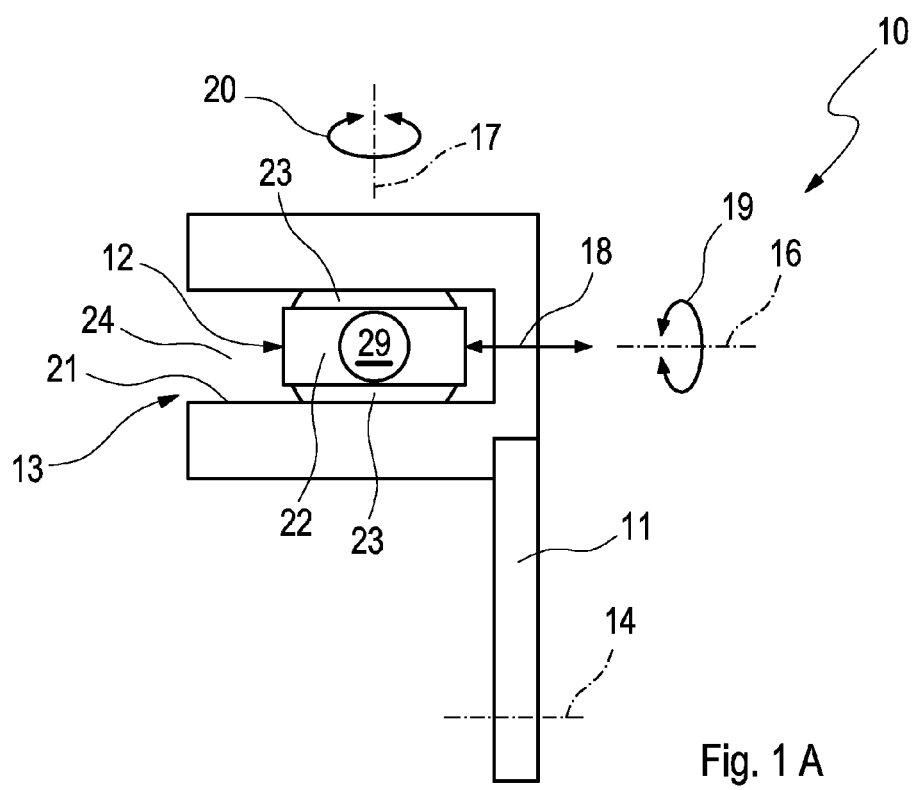
FIG. 1-3 a lateral view (A) and an isometric view (B) of a connecting device each with different embodiments, FIG. 4 a perspective view of an alternative embodiment of a connecting device, FIG. 5 a highly simplified lateral view of a charging device with a driving device.
Figure 1:
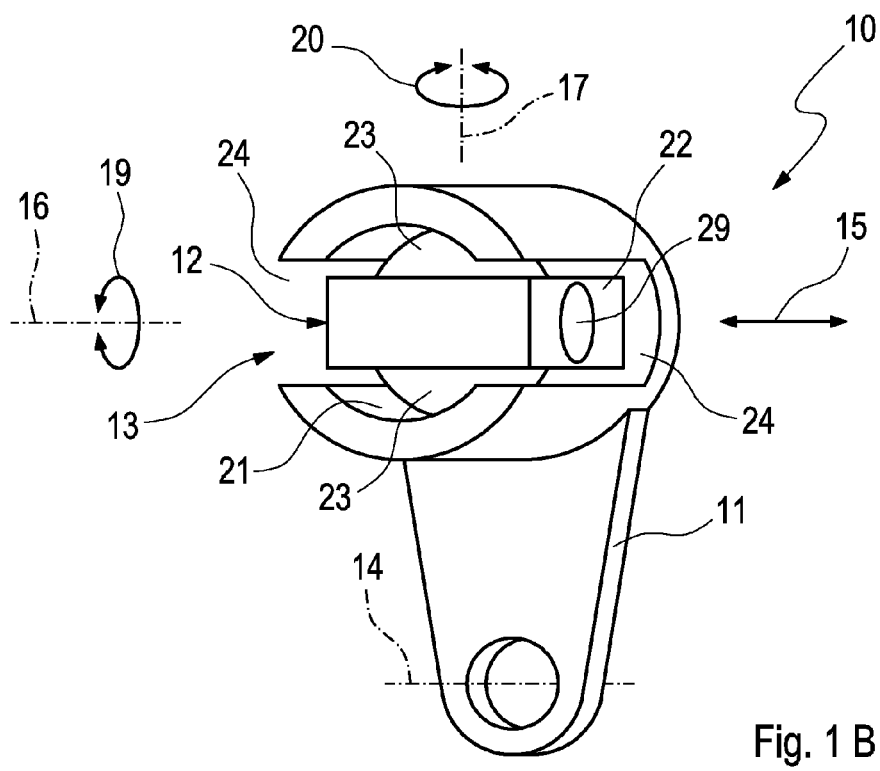
Figure 2:
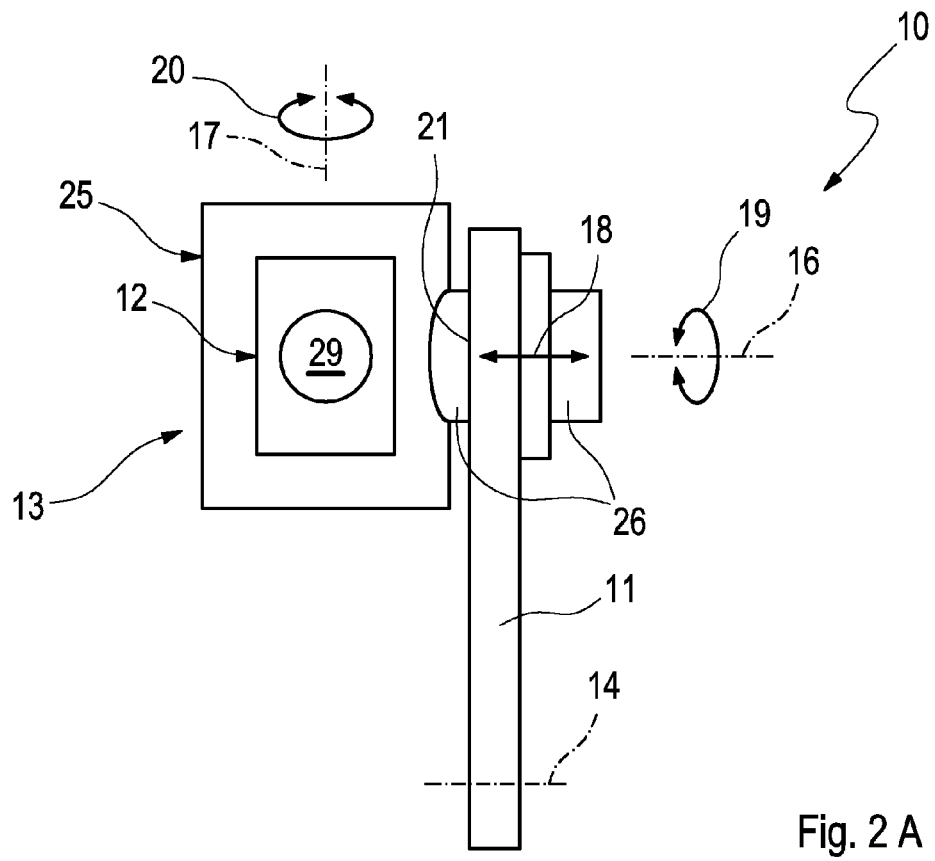
Figure 2:
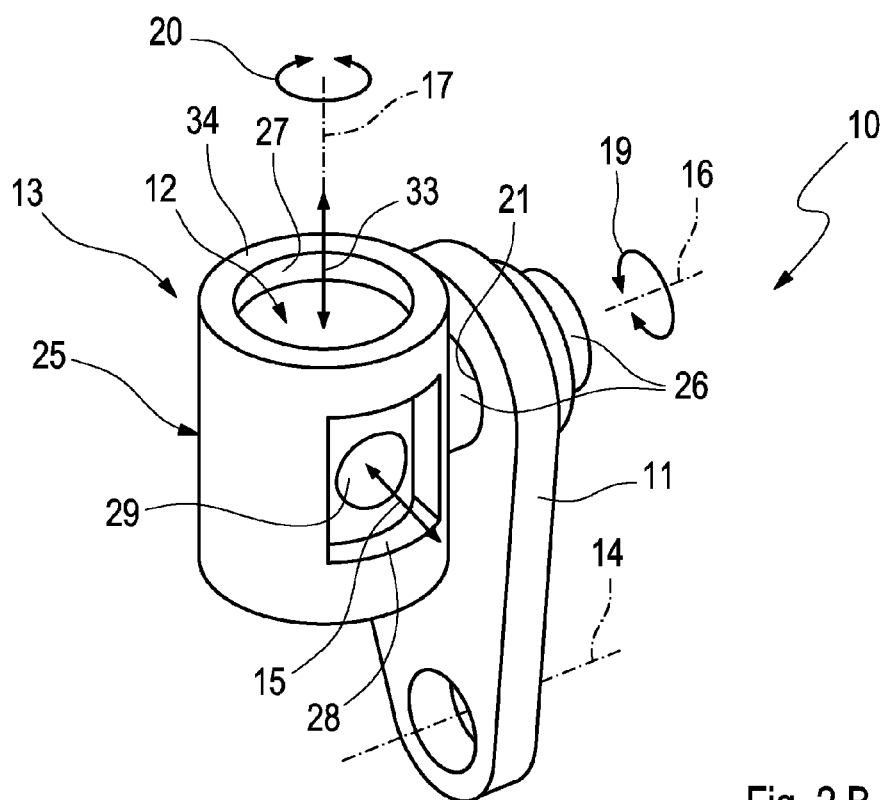
Figure 3:
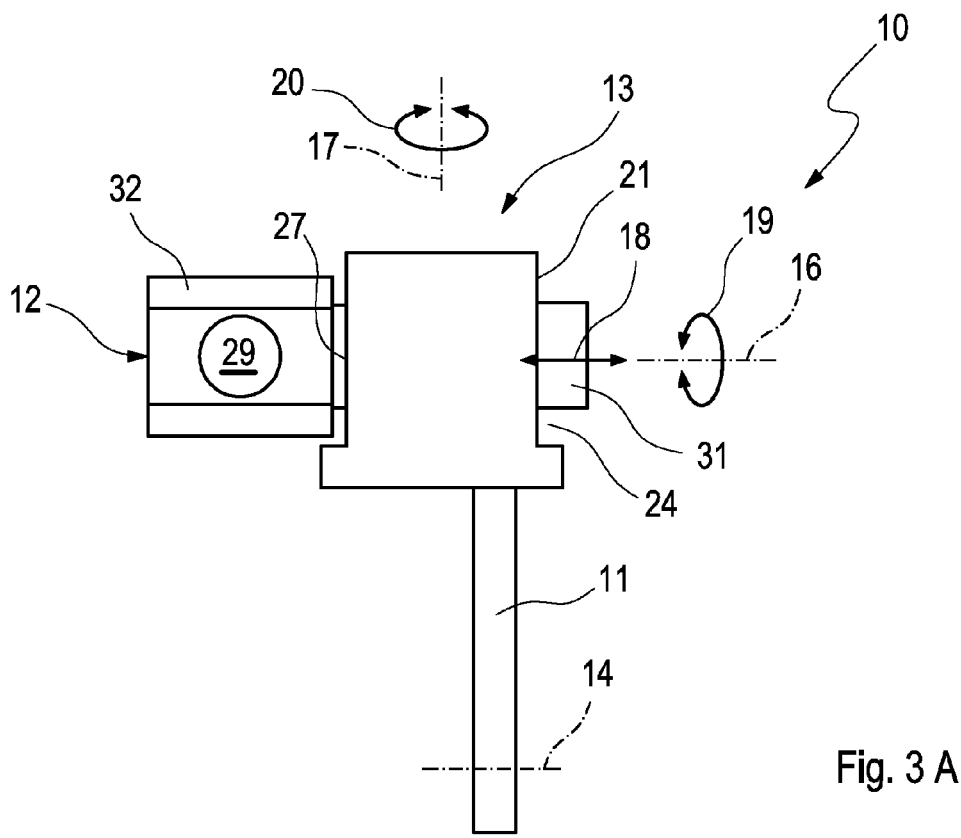
Figure 3:
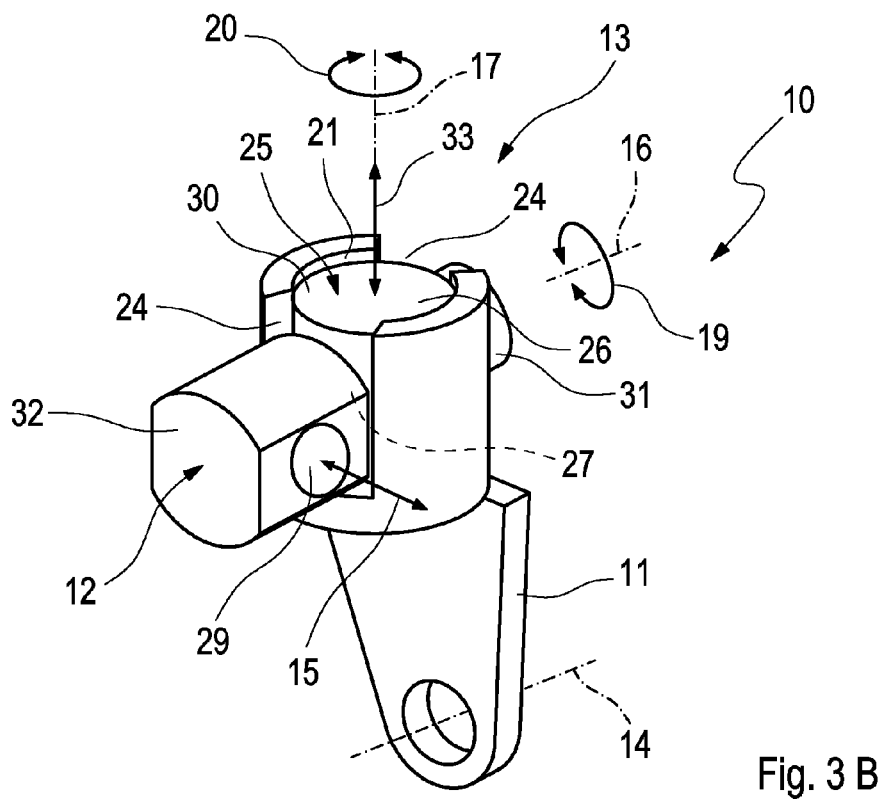

According to FIGS. 1 to 3, such a connecting device 10 comprises a pivot arm 11, a slide element 12 and a bearing arrangement 13. The pivot arm 11 serves to transmit rotational moments about a pivot axis 14 and in the installed state is connected to the actuation member 5 of the adjusting device 2 in a fixed manner. The pivot axis 14 runs coaxially to the rotary axis of the actuating member 5. The pivot arm 11 can also be a part of the adjusting device 2.

The slide element 12 serves to transmit linear forces 15—indicated by a double arrow—which are oriented inclined to the pivot axis 14. Obviously, the linear forces 15 substantially run perpendicularly to the pivot axis 14. The slide element 12 in the assembled state of the connecting device 10 is connected to the driving member 7 of the actuator 6.

The bearing arrangement 13 realizes a jointed coupling of the slide element 12 to the pivot arm 11, namely in such a manner that the slide element 12 is displaceable relative to the pivot arm 11 along a sliding axis 16 extending parallel and spaced from the pivot axis 14 and additionally is rotatably mounted about this displacement axis 16 and about a rotary axis 17 running perpendicularly to the displacement axis 16. The displaceability of the slide element 12 along the displacement axis 16 is indicated by a double arrow 18. The twistability of the slide element 12 about the displacement axis 16 is indicated by a rotary arrow 19. The twistability of the slide element 12 about the rotary axis 17 is indicated by a rotary arrow 20.

In order to be able to connect the slide element 12 to the driving member 7 in a fixed manner, the slide element 12, as with the embodiments of FIGS. 1 and 3, can be equipped with a central through-opening 29, through which a rod-shaped end of the driving member 7 can be inserted in the slide element 12 or inserted through said slide element. Alternatively, it is likewise possible to provide the through-opening 29 with an internal thread, i.e. to configure said through opening as threaded opening so that a corresponding end of the driving member 7, which is provided with an external thread complementary thereto, can be screwed into the slide element 12.

With the embodiments shown here the bearing arrangement 13 is configured as journal bearing characterized by at least one journal mounting 21 which coaxially to the displacement axis 16 (FIGS. 1 and 2) or coaxially to the rotary axis 17 (FIG. 3) has an inner contour. This inner contour of the journal mounting 21 with the embodiments shown in FIGS. 1 and 3 is in each case formed by two circular-cylindrical segments located diametrically opposite each other, while with the embodiment shown in FIG. 2 it is configured circular-cylindrically.

With the embodiments shown in FIGS. 1 to 3 the journal mounting 21 is connected to the pivot arm 11 in a fixed manner, e.g. welded to the latter. Preferable is an embodiment wherein the journal mounting 21 is integrally molded out of the pivot arm 11.

With the embodiment shown in FIGS. 1A and 1B the slide element 12 is directly mounted in the journal mounting 21. To realize the degrees of freedom provided above with the help of the mounting 13, the slide element 12 with this embodiment has a ball-shaped outer contour or an outer contour formed with ball segments 23, which interacts with the inner contour of the journal mounting 21. To this end, the ball radius of the slide element 12 substantially corresponds to the radius of the cylinder of the inner contour of the journal mounting 21. With the exemplary embodiment shown here the slide element 12 comprises a connecting region 22 which radially protrudes over the outer contour described above and interacts with the inner contour of the journal mounting 21. By way of this connecting region 22 the fixed slide element 12 is connected to the driving member 7. To form the outer contour of the slide element 12 interacting with the inner contour of the journal mounting 21 the slide element 12 with this embodiment is equipped with two ball segments 23 which are arranged on both sides of the connecting region 22, so that they accommodate the connecting region 22 between them sandwich-like. Preferably the slide element 12 is integrally produced out of one piece with the connecting region 22 and the two ball segments 23.

The inner contour of the journal mounting 21 in this case is formed through two circular-cylindrical segments located diametrically opposite each other, wherein the inner contour has two interruptions 24 radially to the displacement axis 16, wherein the connecting region 22 protrudes into or through at least one of these interruptions 24. However, in principle, a single interruption 24 within the remaining closed circular-cylindrical inner contour of the journal mounting 21 is sufficient.

While with the embodiment shown in FIG. 1 the slide element 12 via the journal mounting 21 is directly mounted on the pivot arm 11, the embodiments of FIGS. 2 and 3 each show a version wherein the bearing arrangement 13 additionally comprises a coupling member 25. This coupling member 25 comprises a coupling journal 26 which is mounted in the previously described journal mounting 21 formed on the pivot arm 11, wherein this journal mounting 21 in the following is also designated as first journal mounting 21. In addition, the coupling member 25 comprises a further journal mounting 27, which in the following is also designated as second journal mounting 27. In this second journal mounting 27 the slide element 12 is mounted. Insofar, the slide element 12 with these embodiments is mounted via the coupling member 25 and thus indirectly on the pivot arm 11.

With the embodiment shown in FIGS. 2A and 2B the coupling journal 26 in the first journal mounting 21 is displaceably mounted along the displacement axis 16 and rotatably mounted about the displacement axis 16. At the same time, the slide element 12 with this embodiment in the second journal mounting 27 is rotatably mounted about the rotary axis 17 and displaceably mounted along the rotary axis 17. In order to be able to connect the slide element 12 to the drive member 7 with this configuration, the second journal mounting 27 comprises at least one interruption 28 radially to the rotary axis 17, through which the slide element 12 can be connected to the drive member 7.

With the embodiment according to FIG. 2 the slide element 12 is configured as circular-cylindrical journal. Furthermore, the coupling journal 26 is circular-cylindrical with this embodiment. Except for the respective interruption 28 the second journal mounting 27 is likewise configured circular-cylindrically. It is formed in a portion 34 of the coupling member 25, wherein this portion 34 to this end can likewise be formed cylindrically. Here it is particularly advantageous to produce the coupling member 25 so that thereon the coupling journal 26 and the second journal mounting 27 or the portion 34 containing the second journal mounting 27 are integrally molded. It is additionally worth noting that with this embodiment the coupling journal 26 and the second journal mounting 27 are oriented perpendicularly to each other and are formed spatially separated from each other on the same component, namely on the coupling member 25.

With the embodiment shown in FIGS. 3A and 3B the coupling journal 26 and the second journal mounting 27 are integrated in each other, wherein it is provided here to run the second journal mounting 27 in the form of a cylindrical through-opening approximately in the middle transversely through the cylindrical coupling journal 26. With this configuration, the coupling journal 26 is mounted in the first journal mounting 21 rotatably about the rotary axis 17 and displaceably along the rotary axis 17. In contrast with this, the slide element 12 in the second journal mounting 27 is rotatably mounted about the displacement axis 16 and displaceably along the displacement axis 16 with this embodiment.

Accordingly, with this embodiment, the coupling member 25 comprises a coupling element 30 which on the outside forms the cylindrical coupling journal 26 and inside contains the cylindrical second journal mounting 27. Here, the longitudinal center axes of the coupling journal 26 and the second journal mounting 27 stand perpendicularly on top of each other.

With the embodiment according to FIG. 3 the slide element 12 is equipped with a slide element journal 31 which is mounted in the second journal mounting 27. In order for this slide element journal 31 to be able to interact with the second journal mounting 27, the first journal mounting 21, radially to the rotary axis 17, comprises at least one interruption 24 through which the slide element journal 31 protrudes into the second journal mounting 27. In the example, the first journal mounting 21 comprises two circular-cylindrical segments located diametrically opposite each other, which are spaced from each other, and thus form two interruptions 24 in the first journal mounting 21 located diametrically opposite each other.

The slide body 12 with this embodiment additionally comprises a connecting portion 32, via which the slide element 12 can be connected to the drive member 7. For example, the connecting portion 32 to this end contains the through-opening 29 which, as described above, can be equipped with or without internal thread. Practically, slide element journal 31 and connecting portion 32 are integrally molded on to the slide body 12.

With the slide element 12 of FIG. 3, slide element journal 31 and connecting portion 32 are realized locationally separated on the slide element 12. In contrast with this, FIGS. 1 and 2 show integrated embodiments. In particular, FIG. 2 shows a slide element 12 which on the outside is configured as slide element journal 31 and inside contains the through-opening 29 with or without internal thread, wherein it can be more preferably provided that the longitudinal centre axes of this slide element journal 31 and the through-opening 29 stand perpendicularly on top of each other.

By using such a coupling member 25 the embodiments shown in FIGS. 2 and 3 have an additional movement degree of freedom, namely the linear adjustability of the slide element 12 or of the coupling member 25 along the rotary axis 17, which in FIGS. 2 and 3 is indicated by a double arrow 33.

Figure 4:
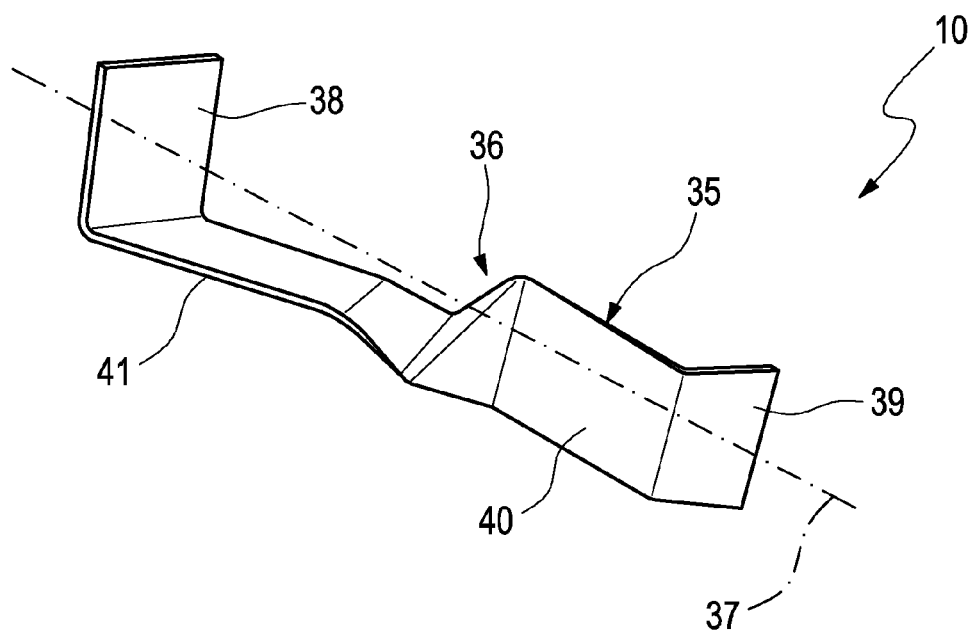

According to FIG. 4, the connecting device 10 with another embodiment can be formed through a spring-elastic, band-shaped element 35 which in the following is also designated as spring band 35. This spring band 35 is characterized by at least one 90° twist 36 with respect to a longitudinal centre axis 37 which runs through the two ends 38 and 39 of the spring band 35. The two ends 38 and 39 in the example are each formed by a band portion angled off by 90°. The angled-off end portion 39 facing the beholder in FIG. 4 is angled off from the following portion 40 of the spring band 39 by 90° to the right. In contrast with this, the other end portion 38 facing away from the beholder is angled off from the portion 41 of the spring band 35 adjacent thereto upwards by approximately 90°. Through the 90° twist 36 the end portions 38, 39 are thus likewise twisted by 90° to each other.

The 90° twist 36 in this case is realized through multiple folding. Alternatively, it can also be realized through twisting or winding or the like. The spring band 35 can be arranged between the driving member 7 and the actuating member 5 and in each case be connected to these two components 7, 5 at its ends 38, 39 in a fixed manner. It is likewise possible to configure this spring band 35 as end portion of the driving member 7, which is connected to the actuating member 5. Furthermore, the entire drive member 7 can be formed by this spring band 35.

The invention claimed is:

1. A connecting device, comprising:
a linearly driving drive member; and
an engine charging device actuating member, the actuating member driven in a rotating manner with at least one pivot arm connected to the actuating member in a fixed manner, wherein the actuating member transmits rotational moments about a pivot axis, with a slide element connected to the driving member in a fixed manner, and wherein the drive member transmits linear forces oriented inclined relative to the pivot axis, with at least one bearing arrangement, which moveably couples the slide element to the pivot arm such that the slide element is displaceably mounted along a displacement axis running parallel to the pivot axis and rotatably mounted about the displacement axis and about a rotary axis running perpendicularly to the displacement axis.

2. The connecting device according to claim 1, wherein the bearing arrangement is configured as a journal bearing having at least one of a journal mounting, an inner contour arranged coaxially to the displacement axis, an inner contour arranged coaxially to the rotary axis, formed circular-cylindrically; and an inner contour arranged with circular-cylindrical segments.

3. The connecting device according to claim 2, wherein the journal mounting is at least one of fixedly connected and integrally molded to the pivot arm.

4. The connecting device according to claim 2, wherein the slide element is directly mounted in the journal mounting, and wherein the slide element has at least one of a ball-shaped outer contour and an outer contour formed with ball segments interacting with the inner contour of the journal mounting.

5. The connecting device according to claim 4, wherein the slide element comprises a connecting region, which radially protrudes over the outer contour interacting with the inner contour, which the slide element is connected to the drive member, and wherein the inner contour of the journal mounting radially to the displacement axis comprises at least one interruption, the at least one interruption at least one of the connected region protrudes into and through which the connecting region protrudes.

6. The connecting device according to claim 1, wherein the bearing arrangement comprises a coupling member having a coupling journal mounted in a (first) journal mounting and a further (second) journal mounting in which the slide element is mounted.

7. The connecting device according to claim 6, wherein the coupling journal is displaceably mounted in the first journal mounting along the displacement axis and rotatably mounted about the displacement axis, and wherein the displacement element in the second journal mounting is rotatably mounted about the rotary axis and displaceably mounted along the rotary axis.

8. The connecting device according to claim 7, wherein the second journal mounting radially to the rotary axis comprises at least one interruption through which the slide body is connected to the drive member.

9. The connecting device according to claim 7, wherein at least one of the slide element is configured as a circular-cylindrical journal and wherein the coupling journal and a cylindrical portion of the coupling member containing the second journal mounting are integrally molded.

10. The connecting device according to claim 6, wherein the coupling journal in the first journal mounting is rotatably mounted about the rotary axis and displaceably mounted along the rotary axis, wherein the slide element in the second journal mounting is rotatably mounted about the displacement axis and rotatably mounted along the displacement axis.

11. The connecting device according to claim 10, wherein the coupling element comprises a coupling element, which on the outside forms the coupling journal and on the inside contains the second journal mounting, and wherein a longitudinal center axis of the coupling journal stands perpendicularly on a longitudinal center axis of the second journal mounting.

12. The connecting device according to claim 11, wherein the slide element comprises a slide element journal, which protrudes into the second journal mounting, wherein the first journal mounting radially to the rotary axis comprises at least one interruption through which the slide element journal protrudes into the second journal mounting, and wherein the slide element journal and a connecting portion of the slide element that is connected to the driving member are integrally molded.

13. An exhaust gas turbo charging device, comprising: an adjusting device, the adjusting device actuates at least one component of the charging device, wherein the charging device includes at least one actuating member driven in a rotary manner, with a driving device for actuating the adjusting device having an actuator for the linear driving of a driving member, and wherein the driving member of the driving device is connected to the actuating member of the adjusting device in a jointed manner via at least one connecting device;

wherein the at least one actuating member transmits rotational moments about a pivot axis, with a slide element connected to the driving member in a fixed manner, and wherein the drive member transmits linear forces oriented inclined relative to the pivot axis, with at least one bearing arrangement, which moveably couples the slide element to the pivot arm such that the slide element is displaceably mounted along a displacement axis running parallel to the pivot axis and rotatably mounted about the displacement axis and about a rotary axis running perpendicularly to the displacement axis.

14. The exhaust gas turbo charging device according to claim 13, wherein the connecting device is at least one pivot arm fixedly connected to the actuating member, wherein the actuating member transmits rotational moments about a pivot axis, with a slide element connected to the driving member in a fixed manner, and wherein the driving member transmits linear forces oriented inclined relative to the pivot axis, with at least one bearing arrangement, which moveably couples the slide element to the pivot arm such that the slide element is displaceably mounted along a displacement axis running parallel to the pivot axis and rotatably mounted about the displacement axis and about a rotary axis running perpendicularly to the displacement axis.

15. The exhaust gas turbo charging device according to claim 13, wherein the bearing arrangement is configured as a journal bearing having at least one of a journal mounting, an inner contour arranged coaxially to the displacement axis, an inner contour arranged coaxially to the rotary axis, formed circular-cylindrically; and an inner contour arranged with circular-cylindrical segments.

16. The exhaust gas turbo charging device according to claim 15, wherein the journal mounting is at least one of fixedly connected and integrally molded to the pivot.

17. The exhaust gas turbo charging device according to claim 15, wherein the slide element is directly mounted in the journal mounting, and wherein the slide element has at least one of a ball-shaped outer contour and an outer contour formed with ball segments interacting with the inner contour of the journal mounting.

18. The exhaust gas turbo charging device according to claim 17, wherein the slide element comprises a connecting region, which radially protrudes over the outer contour interacting with the inner contour, which the slide element is connected to the drive member, and wherein the inner contour of the journal mounting radially to the displacement axis comprises at least one interruption, the at least one interruption at least one of the connected region protrudes into and through which the connecting region protrudes.

19. The exhaust gas turbo charging device according to claim 13, wherein the bearing arrangement comprises a coupling member having a coupling journal mounted in a (first) journal mounting and a further (second) journal mounting in which the slide element is mounted.

20. The exhaust gas turbo charging device according to claim 19, wherein the coupling journal is displaceably mounted in the first journal mounting along the displacement axis and rotatably mounted about the displacement axis, and wherein the displacement element in the second journal mounting is rotatably mounted about the rotary axis and displaceably mounted along the rotary axis.

* * * * *